May 28, 1940.　　　　J. E. FRANCES　　　　2,202,312
FITTING
Filed March 25, 1938
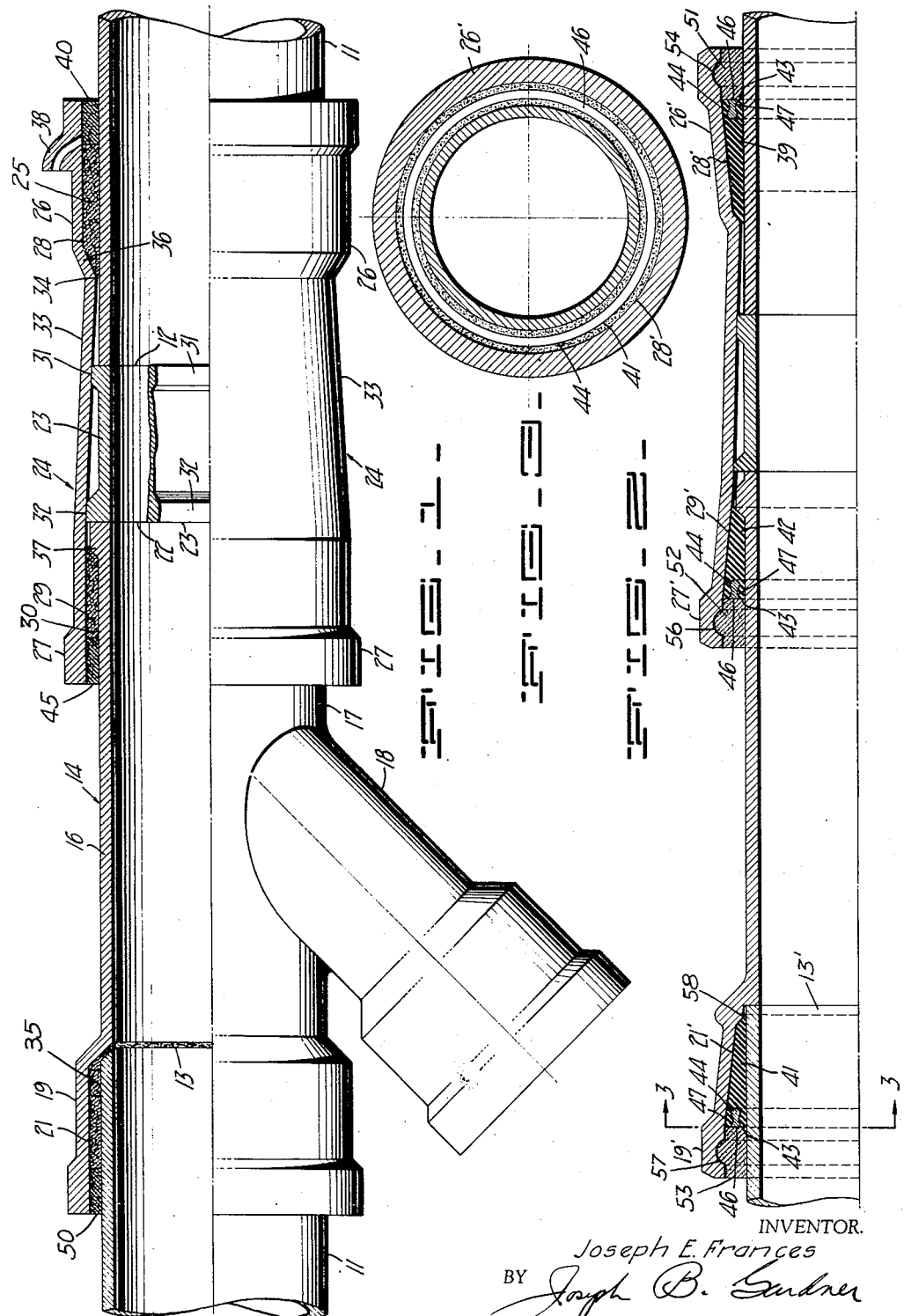
INVENTOR.
Joseph E. Frances
BY Joseph B. Gardner
ATTORNEY.

Patented May 28, 1940

2,202,312

UNITED STATES PATENT OFFICE 2,202,312

FITTING

Joseph E. Frances, Oakland, Calif.

Application March 25, 1938, Serial No. 198,024

6 Claims. (Cl. 285—116)

The invention relates to pipe fittings adapted for connection to various fluid conduits and systems and being particularly arranged for use in drainage, sewerage and venting systems.

An object of the present invention is to provide a device of the character described which will provide for the easy and ready making of a branch connection to an existing conduit line without altering or changing the alignment of the connected portions of the line.

Another object of the present invention is to provide a device of the character described which may be inserted in an existing pipe line at any place along the line without the necessity of making the insertion at a bell hub joint, as heretofore, and thus saving in many instances the removal of portions of floors or walls or other structure to obtain access to a bell hub joint in the conduit line.

A further object of the invention is to provide a branch line insert into an existing conduit line of the character above which may be positively sealed in the line without in anywise interfering with the flow through the line.

The invention possesses other objects and features of advantage, some of which, with the foregoing, will be set forth in the following description of the preferred form of the invention which is illustrated in the drawing accompanying and forming part of the specification. It is to be understood, however, that variations in the showing made by the said drawing and description may be adopted within the scope of the invention as set forth in the claims.

Referring to said drawing:

Figure 1 is a side elevation of a fitting constructed in accordance with the present invention and shown with part of the fitting in section.

Figure 2 is a longitudinal sectional view of a modified form of the fitting.

Figure 3 is a transverse sectional view taken substantially on the plane of line 3—3 of Figure 2.

The fitting of the present invention and as illustrated in the accompanying drawing is arranged for connection to, and insertion in, an existing fluid line here represented by the conduit 11. To effect the connection of the fitting the conduit 11 is cut to remove a section thereof, leaving substantially aligned open end portions 12 and 13, between which a part 14 of the present fitting is inserted. The inserted part 14 here consists of a branch fitting 16 having a longitudinal conduit portion 17 and an angularly extending branch conduit portion 18 and which is enlarged at one end 19 of the body portion 17 to provide a bell hub surrounding the pipe end 13. Preferably, the enlargement of the end 19 is such as to leave an annular packing gland chamber 21 for calking. Preferably, there is inserted between the opposite end 22 of the branch fitting and the end 12 of the conduit, a pipe section 23 which is arranged to abut at its ends the opposite ends 12 and 22 of the conduit and branch fitting, the inside diameters of the conduit and sections 23 and 16 being preferably the same, so as to provide a smooth and continuous interior surface for the flow of liquid or fluid through the line.

The inserted sections 16 and 23 are sealed in alignment with each other and with the conduit 11 by means of a surrounding sleeve 24, which engages over the end 12 of the conduit, around the section 23, and over the end 22 of the branch section 16, and is provided with enlarged bell hub ends 26 and 27 surrounding the pipe end 12 and the branch section end 22 respectively and for defining therewith annular packing gland chambers 28 and 29 for calking. As a preferred feature of the present construction, the inserted section 23 is formed with annular shoulders 31 and 32 adjacent its longitudinal ends which are of different diameter and formed with periphery faces adapted to conform with and wedge against an intermediate tapered portion 33 of the sleeve for securely locking the inserted section in place. The engagement of the tapered portions 31, 32 and 33 also provides a stop for insuring proper longitudinal positioning of the sleeve and if desired, such a stop could be provided by means other than the tapered parts, as for example, appropriately positioned shoulders on the sleeve and one of the sections. Preferably, the reduced end 34 of the tapered portion 33 is of a diameter only slightly larger than the outside diameter of the conduit 11, so that the sleeve will at this portion of its length snugly engage the conduit and in this manner provide an end wall 36 for the packing gland chamber 28. Also preferably, the end 22 of the branch section 16 is provided with an annular shoulder 37 against which packing material may engage when pressed into the gland chamber 29.

The installation of the present fitting in the conduit line may be effected as follows: First, the conduit 11 is cut to remove a section of the existing conduit substantially equal in length to the overall length of the branch section 16, or approximately equal to the combined length of the sections 16 and 23, not including the bell hub end 19 of the section 16. The sleeve 24, which is preferably shorter than the removed pipe section, is then inserted between the cut ends 12 and 13 of the conduit and is slid longitudinally over the conduit end 12. The branch fitting is next positioned between the conduit ends 12 and 13 and shifted longitudinally to position the bell hub 19 over the end 13, producing by this longitudinal shift sufficient space between the opposite end 22 of the branch fitting and the end 12 for the insertion of the pipe section 23, which is next inserted. The sleeve 24 is then moved longitudinally to engage the shoulders 31 and 32 on the section 23 with the tapered portion 33 of the sleeve to produce a firm longitudinal alignment of the several parts. The packing gland chamber 28 may now be hemped as shown at 25, and this operation produces a taut alignment of the installation, facilitating the hemping of the packing gland chambers 29 and 21, as shown at 30 and 35. After the latter operation has been effected, each of the gland chambers are leaded and calked, as shown at 40, 45 and 50.

Preferably, a tubular extension 38 is provided on the bell hub 26 for pouring of lead when the sleeve is used in a vertical position.

A modified form of the invention has been illustrated in Figure 2 of the drawing, wherein the bell hub ends 19', 26' and 27' of the device diverge towards their open ends to define annular tapered packing gland chambers 21', 28' and 29'. In this form of the invention I prefer to use annular tapered glands 39, 41 and 42 of a compressible material such as rubber, composition or the like, and which are adapted to be pressed into the packing chambers. The enlarged exterior end 43 of each of the glands is provided with an annular recess 44 adapted for receipt of a locking ring 46, preferably of metal, which is driven into the recesses for expanding the glands tightly against the side walls of the packing gland chambers. The glands of the present embodiment completely eliminate the requirement of an oakum packed joint and after the glands and the locking rings have been installed, they provide a rigid and snug sealing means, into which molten lead may be poured and calked, as shown at 51, 52 and 53, to complete the joint. The tapered form of the chamber also effectively prevents the drifting down of the lead into the bell hubs, as is frequently encountered in straight wall chambers and also provides a means for tightening or pinning the calked joint to the bell wall or inserted pipe. Also to secure the lead in place, I prefer to provide annular recesses 54, 56 and 57 in the bell hubs. The rings may be provided with tapered locking tongue portions 47 for engagement in complementary formed portions of the recesses 44 to more effectively expand the glands and to better lock the rings in position.

Preferably, there is provided at the inner ends of the bell hub 19', an annular shoulder 58 to assist in centering the pipe end 13' and to hold the parts in proper alignment.

I claim:

1. A fitting adapted for insertion between and connection to spaced pipe ends comprising, a pipe section mounted between said ends and abutting one of said ends, a second pipe section inserted between said first section and said other pipe end, and a sleeve engageable over said last named pipe end and both said sections and having a wedged engagement with said second named section.

2. A fitting adapted for insertion between and connection to spaced opposed pipe ends comprising, a pipe section mounted between said ends and having an enlarged end surrounding one of said pipe ends for calking, a second pipe section adapted for mounting between said first section and said other pipe end, and a sleeve engageable over said last named pipe end and over both of said sections and having a wedged engagement with said second named section and being formed with enlarged opposite ends for calking to seal said last named pipe end and said first section.

3. A fitting adapted for insertion between and connection to spaced aligned open pipe ends of a pipe line comprising, a sleeve engageable at one end over one of said pipe ends, a pipe section having an enlarged end adapted to engage over the other pipe end and to fit in the opposite end of said sleeve, a second pipe section adapted to abut the opposite end of said first section and said first named pipe end, said sleeve and said second section having engageable tapered portions adapted to wedge said sleeve and section together upon longitudinal displacement of said sleeve thereover.

4. A fitting adapted for insertion between and connection to spaced aligned open pipe ends of a pipe line comprising, a sleeve engageable at one end over one of said pipe ends, a pipe section having an enlarged end adapted to engage over the other pipe end and to fit in the opposite end of said sleeve, a second pipe section adapted to abut the opposite end of said first section and said first named pipe end and provided with spaced annular shoulders having tapered surfaces, said sleeve being formed with a tapered portion adapted to wedge against said tapered shoulder surfaces upon longitudinal displacement of said sleeve relative to said second section.

5. A branch line fitting adapted for insertion into a pipe line at any desired position along the line after cutting of the pipe line at a desired place of insertion to remove a section of the line and to expose spaced open pipe ends, a branch pipe section having a length approximately equal to that of the removed pipe section and having a bell hub at one end adapted to engage over one of said pipe ends for sealing the branch section thereto, a pipe section having a length approximately equal to the length of the removed pipe section less the length of said branch section less the length of said bell hub and adapted for insertion between the opposite end of said branch section and said other pipe end, and a sleeve adapted to surround and having a length extending over said last named section end and said second section and said last named pipe end and formed with bell hubs at its opposite ends for sealing to said branch section and said last named pipe end.

6. A branch line fitting adapted for insertionu into an existing pipe line after cutting the line at any desired place along the line for insertion of the fitting to remove a section of the line and to expose spaced open pipe ends, a branch pipe section having a length approximately equal to the removed pipe section and having a bell hub at one end adapted to engage over one of said pipe ends for sealing the branch section thereto, a second pipe section having a length approximately equal to the length of said bell hub and adapted for insertion between the opposite end of said branch section and said other pipe end, a sleeve adapted to surround and having a length extending over said last named section end and said second section and said last named pipe end and formed with bell hubs at its opposite ends for sealing to said branch section and said last named pipe end, and means engaging the exterior of said second pipe section with the interior of said sleeve for centering said section and sleeve.

JOSEPH E. FRANCES.